(12) United States Patent
Boettcher

(10) Patent No.: US 11,244,005 B1
(45) Date of Patent: Feb. 8, 2022

(54) SYSTEM FOR AMPLIFYING USER ONLINE VISIBILITY AND CREDIBILITY

(71) Applicant: Jeffrey Boettcher, Scottsdale, AZ (US)

(72) Inventor: Jeffrey Boettcher, Scottsdale, AZ (US)

(*) Notice: Subject to any disclaimer, the term of this patent is extended or adjusted under 35 U.S.C. 154(b) by 0 days.

(21) Appl. No.: 17/372,889

(22) Filed: Jul. 12, 2021

(51) Int. Cl.
*G06F 16/9032* (2019.01)
*G06F 16/93* (2019.01)
*G06F 9/451* (2018.01)
*G06Q 50/00* (2012.01)

(52) U.S. Cl.
CPC ......... *G06F 16/9032* (2019.01); *G06F 9/451* (2018.02); *G06F 16/93* (2019.01); *G06Q 50/01* (2013.01)

(58) Field of Classification Search
CPC ...... G06F 16/9032; G06F 16/93; G06F 9/451; G06Q 50/01
See application file for complete search history.

(56) References Cited

U.S. PATENT DOCUMENTS

| | | | |
|---|---|---|---|
| 6,993,496 B2* | 1/2006 | Pittelli | G06Q 10/06375 705/7.31 |
| 10,015,244 B1 | 7/2018 | Cronin et al. | |
| 10,257,208 B1* | 4/2019 | Bennett | H04L 63/123 |
| 10,262,029 B1* | 4/2019 | Chu | G06Q 30/02 |
| 10,970,353 B1* | 4/2021 | Osinga | G06F 16/955 |
| 2006/0015475 A1 | 1/2006 | Birkner et al. | |
| 2009/0006442 A1* | 1/2009 | Anderson | G06F 16/9562 |
| 2009/0248542 A1 | 10/2009 | Houvener et al. | |
| 2010/0281150 A1* | 11/2010 | Sailhan | H04L 41/0631 709/223 |
| 2012/0144301 A1* | 6/2012 | Bass | G09B 19/0092 715/709 |
| 2012/0304072 A1* | 11/2012 | Mercuri | G06Q 50/01 715/745 |
| 2013/0024431 A1* | 1/2013 | Parthasarathy | G06F 16/3334 707/692 |
| 2013/0166565 A1* | 6/2013 | Lepsoe | G06F 16/358 707/740 |
| 2014/0047111 A1* | 2/2014 | Petta | G06F 21/552 709/224 |
| 2014/0108143 A1* | 4/2014 | Davitz | G06Q 30/0275 705/14.53 |
| 2014/0172505 A1 | 6/2014 | Dekhtyaruk | |

(Continued)

*Primary Examiner* — Etienne P Leroux
(74) *Attorney, Agent, or Firm* — The Rapacke Law Group P.A.

(57) ABSTRACT

A system and computer implemented method for amplifying the online visibility and credibility of a user of an application platform is provided. The system includes an application platform for carrying out the method; a desired work related to a defined topic; a drafted work from a creator that is graded based on predetermined attributes; an automated reader configured to read, identify, and tag keywords; target websites having attributes associated with the defined topic or keywords; one or more accepted users for sponsoring the drafted work on a selected target website; a matching user to sponsor the drafted work; an enhanced work enhanced for the keywords and the matching user; a transmission of the enhanced work to a selected target website; a published work on target website; and a symbiotic sharing the work on one or more social media platforms selected by the matching user.

13 Claims, 9 Drawing Sheets

(56) References Cited

U.S. PATENT DOCUMENTS

| | | | |
|---|---|---|---|
| 2014/0351271 A1* | 11/2014 | Fairchild-Coppoletti | ............... G06Q 10/10 707/749 |
| 2015/0161345 A1* | 6/2015 | Tippett | ............ G16H 80/00 705/3 |
| 2015/0220941 A1* | 8/2015 | Tamir | ............ G06Q 30/0201 705/7.29 |
| 2015/0269611 A1* | 9/2015 | Heffernan | ............ H04L 51/32 705/14.45 |
| 2016/0027031 A1* | 1/2016 | Bubic | ............ H04L 67/26 705/5 |
| 2017/0085919 A1* | 3/2017 | Thompson | ....... H04N 21/25825 |
| 2017/0185666 A1* | 6/2017 | Pasternack | .......... G06F 16/2228 |
| 2017/0213166 A1 | 7/2017 | Lee | |
| 2018/0039644 A1* | 2/2018 | Bonanni | ............ G06F 16/958 |
| 2018/0247337 A1* | 8/2018 | Gourley | ................ G06Q 50/01 |
| 2018/0371984 A1* | 12/2018 | Goldman | ............ G06Q 30/02 |
| 2019/0243919 A1* | 8/2019 | Kota | ................ G06F 16/353 |
| 2020/0012400 A1* | 1/2020 | Bilinski | .......... H04N 21/47214 |
| 2020/0014648 A1* | 1/2020 | McEvoy | ............ G06Q 10/107 |
| 2020/0278978 A1* | 9/2020 | Lundberg | .......... G06F 16/24578 |
| 2020/0302405 A1* | 9/2020 | Khan | .............. G06Q 10/1097 |
| 2020/0372525 A1* | 11/2020 | Holmes | ............... H04L 67/10 |
| 2021/0117057 A1* | 4/2021 | Barak | ................ G06F 9/44526 |
| 2021/0182352 A1* | 6/2021 | Mallah | .............. G06F 16/24575 |
| 2021/0182367 A1* | 6/2021 | Shin | ...................... G06F 21/105 |

* cited by examiner

SYSTEM FOR AMPLIFYING USER ONLINE VISIBILITY AND CREDIBILITY

FIELD

The present disclosure relates to a system and method for amplifying a user's online visibility and credibility; and more particularly, to a system and method for automatically reading, enhancing, publishing, and sharing topical user content to affiliated and non-affiliated websites and social media platforms.

BACKGROUND

Internet search engines have three primary functions: crawling, i.e., scour the Internet for content, including looking through the code and/or content for each URL (uniform resource locator) that is found; indexing, i.e., storing and organizing the content found during the crawling process; and ranking, i.e., providing the most relevant content to respond to an online searcher's query. Content published online is worthless unless a search engine can find, index, and rank the website containing the published content so an interested searcher can find it. When content is found by an interested searcher, it may be shared with other people or referenced in other content, each of which increases the visibility and credibility of the content and the associated author or sponsor.

Existing methods and systems for facilitating the discovery, indexing, and ranking of content by search engine include inefficient and labor-intensive search engine optimization (SEO) functions, such as publishing manually written content (e.g., blogging), creating backlinks in the published content to other content or third-party websites, adding anchor tags or on-page links to specific locations on the webpage or another webpage within the website, or third-party websites and sharing content on various websites and social media platforms. Furthermore, existing methods and systems are user-specific, and each content creator is siloed without any ability to control how their content is shared or linked to by others. For the foregoing reasons, there is a need for a new method and system for efficiently amplifying a user's online visibility and credibility.

SUMMARY

In various embodiments, a computer implemented method for amplifying the online visibility and credibility of a user of an application platform is provided. The method can include: providing the application platform for carrying out the method; assigning a desired work related to a defined topic to a creator; receiving a drafted work from the creator in an electronic file type; grading the drafted work based on one or more predetermined attributes; reading the drafted work with an automated reader configured to read the electronic file type to identify and tag one or more keywords corresponding to the defined topic; identifying one or more target websites having attributes associated with the defined topic and/or the one or more keywords; identifying one or more accepted users for sponsoring the drafted work on a selected target website of the one or more target websites; selecting the matching user from the identified one or more accepted users to sponsor the drafted work; enhancing the drafted work for the keywords and the matching user to obtain the desired work; transmitting the desired work to the selected target website; publishing the desired work on the selected target website; and sharing the desired work on one or more social media platforms selected by the matching user.

In various embodiments, a computer program product having a non-transitory, computer readable storage medium having program instructions embodied therewith, the program instructions executable by a computer processor to cause the computer processor to perform a method is provided. The product performed on the computer program product can include: providing an application platform for carrying out the method; assigning a desired work related to a defined topic for drafting to a creator; receiving the drafted work from the creator in an electronic file type; grading the drafted work based on one or more predetermined attributes; reading the drafted work with an automated reader configured to read the electronic file type to identify and tag one or more keywords corresponding to the defined topic; identifying one or more target websites having attributes associated with the defined topic and/or the one or more keywords; identifying one or more accepted users for sponsoring the drafted work on a selected target website of the one or more target websites; selecting the matching user from the identified one or more accepted users to sponsor the drafted work; enhancing the drafted work for the keywords and the matching user to obtain the desired work; transmitting the desired work to the selected target website; publishing the desired work on the selected target website; and sharing the desired work on one or more social media platforms selected by the matching user.

In various embodiments, a computer system for amplifying a user's online visibility and credibility is provided. The system can include: at least one computing device in operable communication with a network; a memory that stores computer-executable components; one or more processors that execute the computer-executable components stored in the memory, wherein the computer-executable components include: a user module providing one or more user interfaces for registering users with the system; a content module providing one or more user interfaces for receiving content; a reading module configured to analyze the content; a target website module for publishing the content; an enhancement module for enhancing one or more keywords and/or a sponsor name associated with the content; a sharing module for sharing the published content on one or more social media platforms; and a database engine facilitating communication between the computer-executable components stored in the memory and one or more databases, wherein the one or more databases includes: a user database for storing data related to registered users of the system; a topic database for storing data related to topics offered by the system; a target website database for storing data related to target websites that are affiliated with the system; a content database for storing data related to the content; a social media database for storing data related to the one or more social media platforms; wherein the computer-executable components further include instructions for: providing an application platform for carrying out the method; assigning a desired work related to a defined topic to a creator; receiving the drafted work from the creator in an electronic file type; grading the drafted work based on one or more predetermined attributes; reading the drafted work with an automated reader configured to read the electronic file type to identify and tag one or more keywords corresponding to the defined topic; identifying one or more target websites having attributes associated with the defined topic and/or the one or more keywords; identifying one or more accepted users for sponsoring the drafted work on a selected target website of the one or more target websites; selecting the matching user to sponsor the drafted work; enhancing the drafted work for the keywords and the matching user to obtain the desired work; transmitting the desired work to the selected target website; publishing the desired work on the selected target website; and sharing the desired work on the one or more social media platforms selected by the matching user.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings.

Both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

The features and advantages of the present disclosure will be more fully described in, or rendered obvious by the following detailed description of the preferred embodiments, which are to be considered together with the accompanying drawings wherein like numbers refer to like parts and further, wherein.

DETAILED DESCRIPTION

Figure 1:
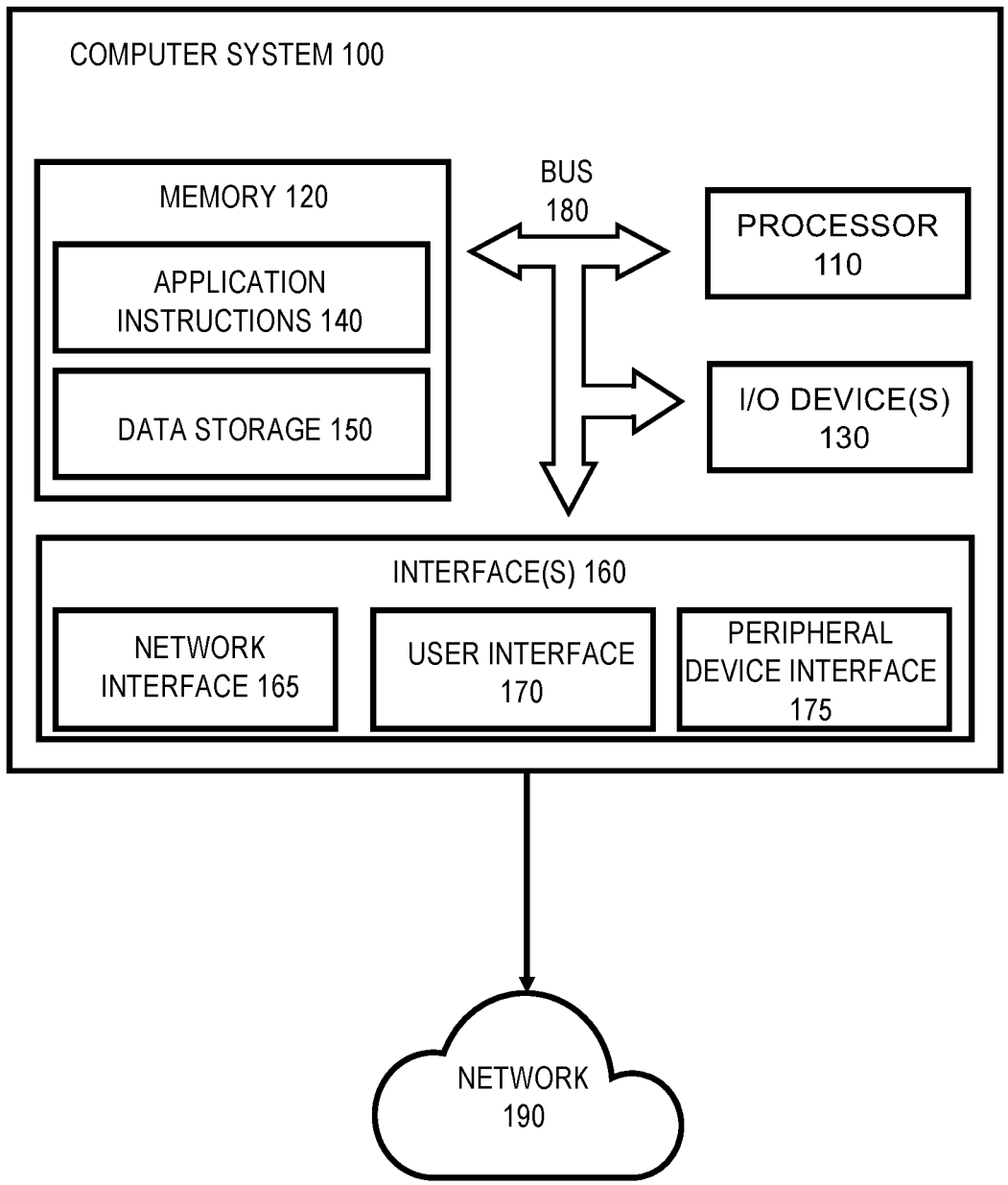
FIG. 1 is a block diagram of a computing system, in accordance with some embodiments described herein.

Reference will now be made in detail to the present preferred embodiment(s), and examples of which is/are illustrated in the accompanying drawings. Whenever possible, the same reference numerals will be used throughout the drawings to refer to the same or like parts. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this disclosure, the various embodiments may be a system, method, apparatus, and/or computer program product at any possible technical detail level of integration. A computer program product can include, among other things, a computer-readable storage medium having computer-readable program instructions thereon for causing a processor to carry out aspects of the present disclosure.

In various embodiments, a computer implemented method and system configured to execute instructions for performing the method are provided. The method and system provide an automatic symbiotic benefit of increased online visibility and credibility for disparate users that is not provided by existing technologies.

As shown in FIGS. 1-8, the embodiments in this disclosure generally relate to systems and processes for efficiently amplifying a user's online visibility and credibility through the symbiotic user relationships established by the systems and processes.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units, and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 150, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet).

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 2:
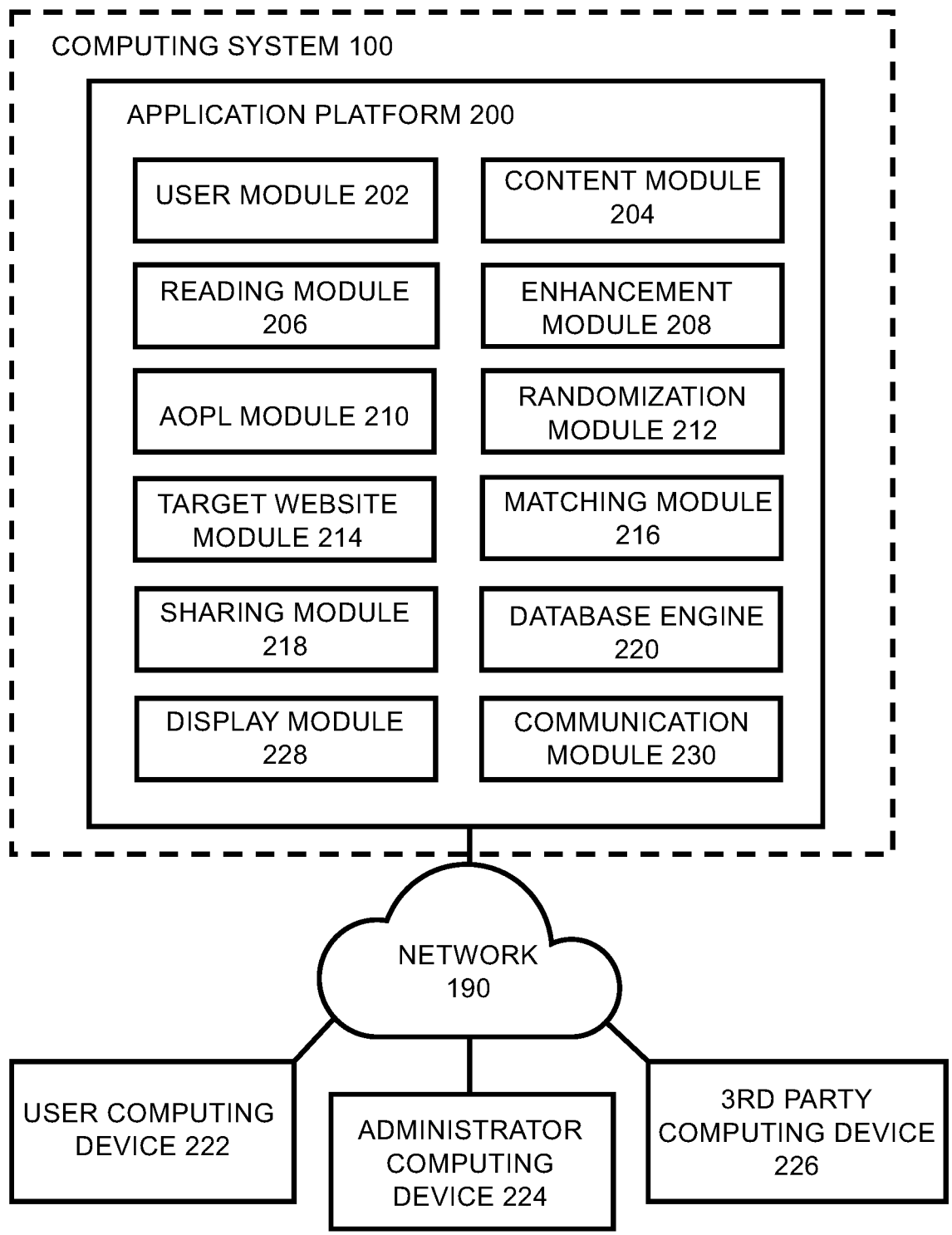
FIG. 2 is a block diagram of a computing system and an application platform, in accordance with some embodiments described herein.
Figure 3:
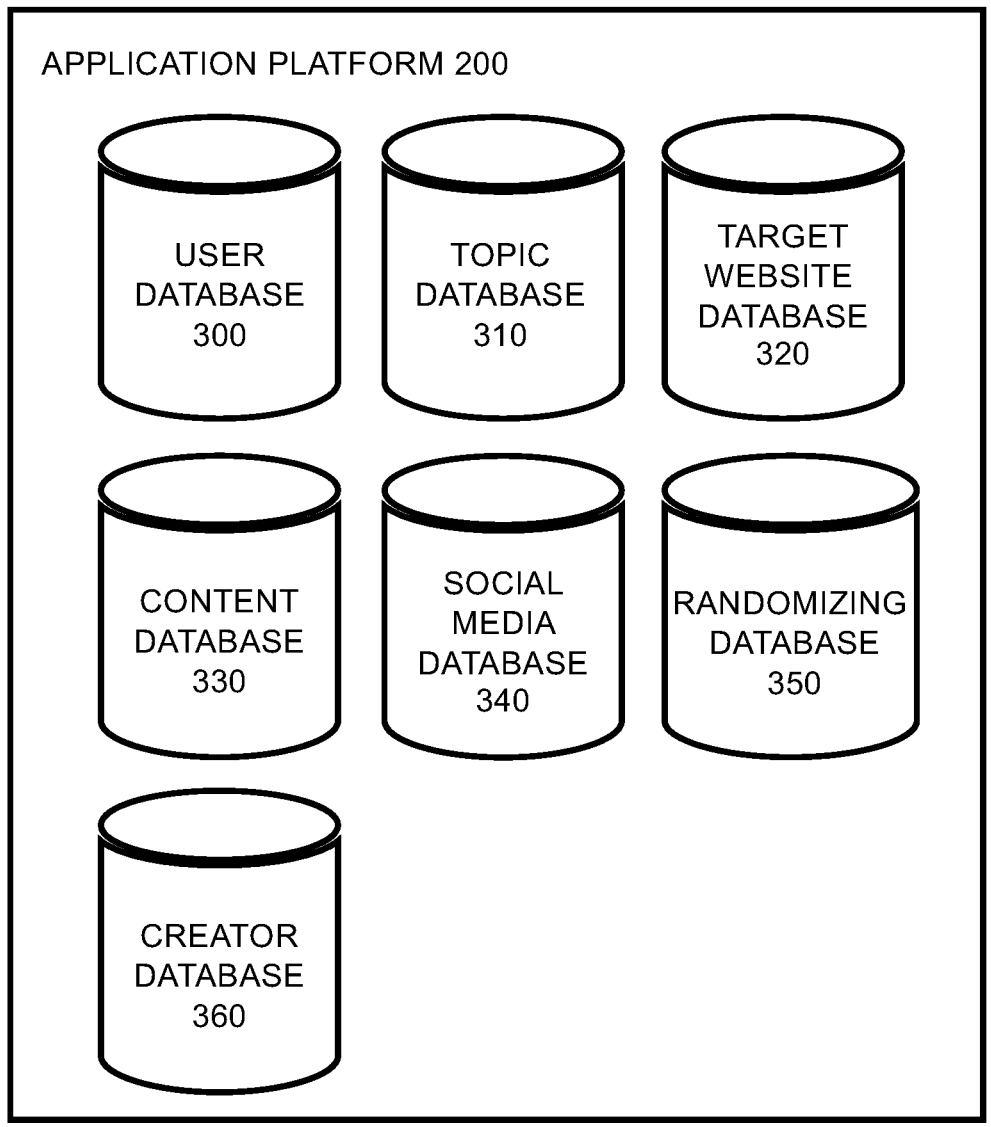
FIG. 3 is a further block diagram of the application platform of FIG. 2.

FIGS. 2 and 3 illustrate an example computer architecture for the application platform 200 that facilitates the amplification of a user's online visibility and credibility. As shown in FIGS. 2 and 3, the computer system 100 is coupled to a plurality of databases, including a user database 300, a topic database 310, a target website database 320, a content database 330, a social media database 340, a randomizing database 350, and a creator database 360. The computer system 100 comprises several modules and engines configured to facilitate the amplification of a user's online profile, and a database engine 220 configured to facilitate how data is stored and managed. In particular, FIG. 2 is a block diagram showing the modules and engines needed to perform specific tasks within the application platform 200, and FIG. 3 is a block diagram showing the various databases utilized by the various modules.

In some embodiments, the user database 300 contains stored data related to the users that use the application platform 200. Users can optionally subscribe to a service provided by the system. In such embodiments, the user database 300 stores usernames, login information, and user profile information, as well as any other information supplied by a user, such as payment methods for a subscription service. As used herein, the term "user" includes a person or entity (e.g., company, school, non-profit organization, etc. In some embodiments, the user profile information comprises the primary topics of interest selected by the user, the "target website(s)" (a website with content focused on a specific topic, niche, or business interest) selected by the user, and any other information identified by the user, including, for example, one or more websites they are affiliated with or hope to promote. For example, if the user is a lawyer, then a website identified by the user may be a public webpage showing the user's biography, contact information, and/or practice areas. As another example, if the user is a real estate service company, then the identified website may be a landing page highlighting the company's services, capabilities, and track record.

In some embodiments, the topic database 310 contains stored data related to one or more topics offered by the system administrator and/or requested or selected by users. For example, if the user is a lawyer, then the system may offer topics that relate to specific areas of legal practice, such as personal injury, real estate, bankruptcy, etc. The topics may relate to a user's specialized skills, areas of practice, areas of interest, etc. The data stored in the topic database 310 can be analyzed to identify, for example, the most frequently selected user topics. In some embodiments, the topics offered by the system are determined by the target websites offered by, or otherwise allied with, the application platform 200. For example, if a target website is a legal news website, then the topics associated with the target website may include government agency regulations, proposed local, state, or national legislation, and/or state or federal court decisions.

In some embodiments, the target website database 320 contains stored data related to the target websites offered by, or otherwise affiliated with, the application platform 200. As used herein, a target website is a website directed to a general area of interest (e.g., legal, insurance, financial, etc.), and which may be configured to feature content about a specific topic or grouping of topics. In some embodiments, the system administrator owns and controls one or more target websites. In some embodiments, the target websites are owned and controlled by an unaffiliated third party. In some embodiments, an unaffiliated third-party target website is purposefully or passively linked to the application platform 200. In some embodiments, the data stored in the target website database 320 is analyzed to determine, for example, the most frequently selected target websites or topics, or the websites having the highest rankings.

In some embodiments, the content database 330 contains stored data related to the various content uploaded to, imported by, submitted to, or otherwise received by the application platform 200. For example, an article, blog, video, infographic, meme, audio recording, etc., created by the system administrator or uploaded to the application platform 200 by a user will be saved into the content database 330. In various embodiments, the content is an article featuring a discussion of one or more specific topics, including, for example, one or more topics associated with a specific target website.

In some embodiments, the social media database 340 contains stored data related to one or more social media platforms linked to the application platform 200 and/or identified by a user as a platform that may be linked to the application platform 200 in the future. In some embodiments, the social media database 340 contains the content shared on one or more specific social media platforms via the application platform 200, and any user engagement data (e.g., data tracked through analytical software) associated with the shared content on each specific social media platform.

In some embodiments, the randomization database 350 contains stored data related to one or more algorithms used to select sponsors for a work that has been submitted and accepted by the system and/or administrators, topics for the work, and second users selected for sharing the work on one or more of their social media platform(s). In some embodiments, one or more tables are created to manage data associated with the one or more algorithms. For example, in some embodiments, if a first-listed sponsor, topic, or second user listed on a table is selected in the methods described herein, then the algorithm can demote that sponsor, topic, or second user to the last-listed sponsor, topic, or second user on the table. In this process, a different, second-listed sponsor, topic, or second user listed on the table will become the first-listed, and selected for the next work processed in the methods described herein. In some embodiments, the highest-listed sponsor, topic, or second user on a table will be selected for the next work processed in the methods described herein, whereby the selection is based on a match between the attributes of the work and the attributes of the sponsor, topic, or second user. In such a case, the algorithms can include an evaluation of each entry on the table to until the best match is found. If the last-listed sponsor, topic, or second user on the table is determined to be the best match, then that sponsor, topic, or second user may be selected for the next work processed in the system, even if that means the sponsor, topic, or second user is selected twice in a row. Any data related to the tables of sponsors, topics, and second users, as well as any data related to the algorithm used to select a sponsor, topic, or second user is retrievably stored in the randomization database 350.

In some embodiments, the creator database 360 contains stored data related to one or more authors, creators, artists, or other contributors of desired work to the system. In some embodiments, a creator is assigned to draft/prepare the work desired by the administrator and/or a target website. In some embodiments, the work submitted by each creator is evaluated for various attributes and a determination is made as to the quality of the work. Any data related to the contributors, as well as any evaluations and/or rankings determined for their work, is retrievably stored in the creator database 360.

Referring to FIG. 2, the application platform 200 comprises one or more modules having the necessary routines and data structures for performing specific tasks, and one or more engines configured to determine how the platform manages and manipulates data. In some embodiments, the application platform 200 comprises one or more of a user module 202, a content module 204, a reading module 206, an enhancement module 208, an automatic on-page link (AOPL) module 210, a randomizing module 212, a target website ("target") module 214, a matching module 216, a sharing module 218, a database engine 220, a display module 228, and a communication module 230.

In some embodiments, the user module 202 is configured to facilitate the creation of a user identity for new users. In such embodiments, as shown in step 410 in FIG. 4A, the process 400a begins with the user creating an account in the application platform 200, and the information provided by the user is saved as user information. In step 415, the user is prompted to select (e.g., dropdown menu, dynamic search field, radio button) and/or input one or more topics they are interested in. Any number of topics is contemplated. In some embodiments, for example, the system will request a single topic, two topics, three topics, five topics, ten topics, etc. In step 415, if the user selects a plurality of topics, the user is further prompted to rank their topics in order of importance, or in reverse order of importance. Listing and ranking the topics can occur sequentially or simultaneously (e.g., on the same or different user interface). In some embodiments, for example, the selected topics are related to a target audience or market the user works in or is interested in. In step 420, the system will prompt the user to select (e.g., dropdown menu, dynamic search field, radio button) or input one or more target websites they are interested in having content published on. Any number of target websites is contemplated. In some embodiments, for example, the system will request a single target website, two target websites, three target websites, five target websites, ten target websites, etc.

Figure 4A:
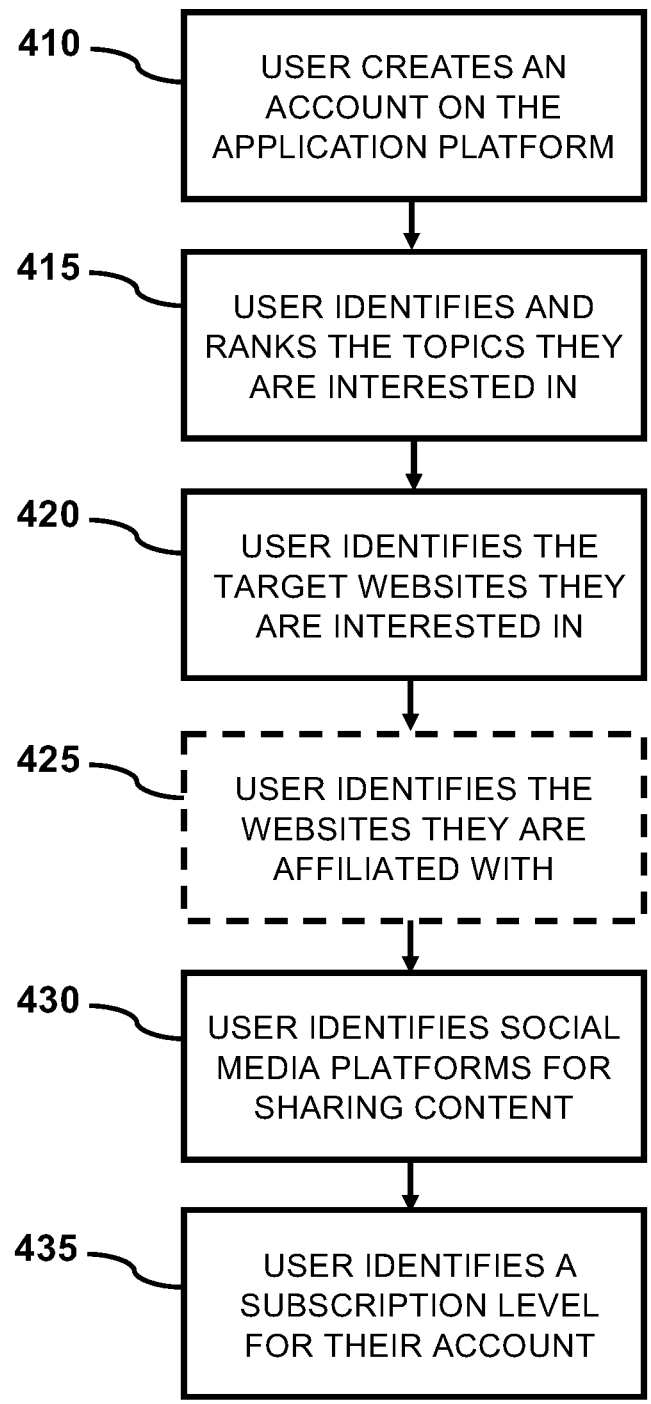
FIG. 4A is a flowchart of a process in accordance with some embodiments described herein.
Figure 4B:
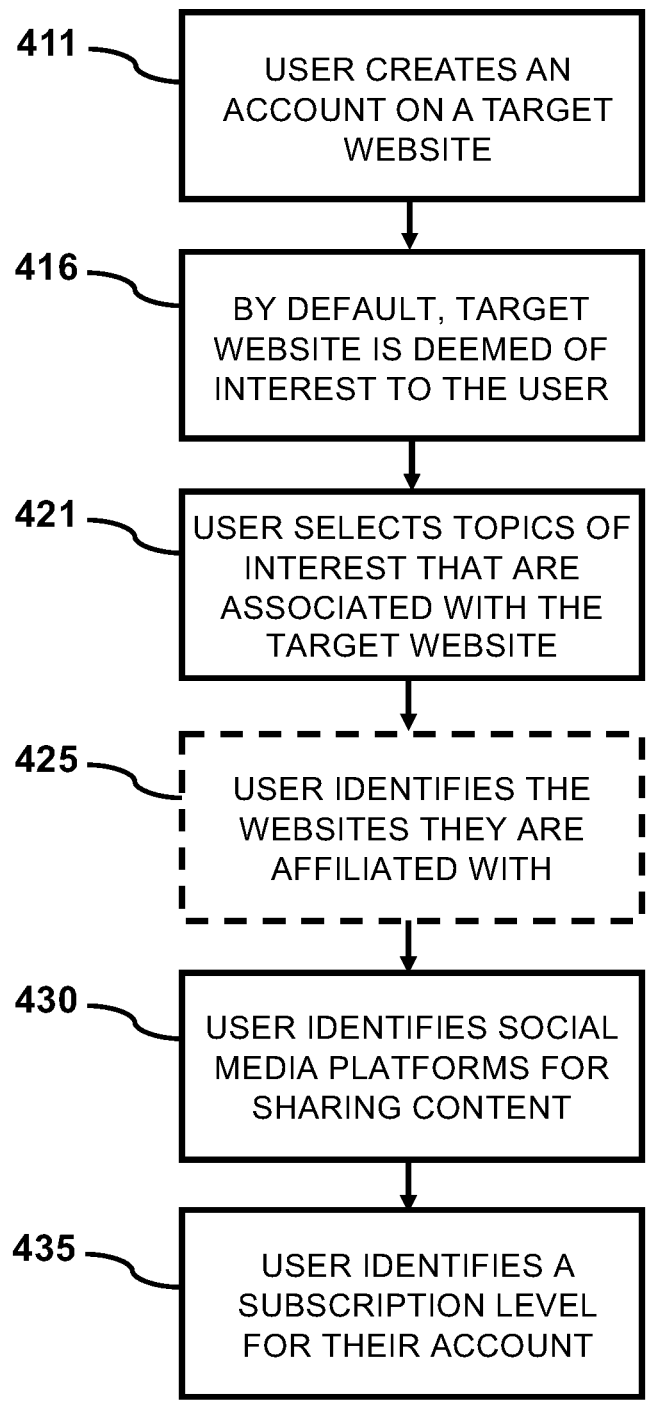
FIG. 4B is a flowchart of a process in accordance with some embodiments described herein

Alternatively, in step 411 in FIG. 4B, the process 400b begins with the user creating an account on a target website. In some embodiments, the target website includes a paywall requiring a user to create a user identity in order to access the website. In such embodiments, as shown in step 411 in FIG. 4B, the process begins with the user creating an account in the target website. In step 416, the system will presume that the user is interested in the specific target website they have created an account on. In some embodiments, the user may be prompted to select any number of alternative target websites. In step 421, the user is prompted to select (e.g., dropdown menu, dynamic search field, radio button) and/or input one or more topics they are interested in. In some embodiments, the topics are predetermined based on the specific target website. For example, if the target website relates to financial investment strategies, a topic may include annuities. Any number of topics is contemplated. In some embodiments, for example, the system will request a single topic, two topics, three topics, five topics, ten topics, etc. In step 421, if the user selects a plurality of topics, the user is further prompted to rank their topics in order of importance, or in reverse order of importance. Listing and ranking the topics can occur sequentially or simultaneously (e.g., on the same or different user interface). In some embodiments, for example, the selected topics are related to a target audience or market the user works in or is interested in.

Optionally, as indicated by the broken lines in FIGS. 4A and 4B, in step 425, the system will prompt the user to select or input one or more websites they are associated or affiliated with. Any number of websites is contemplated. In some embodiments, for example, the system will request a single website, two websites, three websites, five websites, ten websites, etc. In step 430, the system will prompt the user to select or input the social media platforms they belong to and/or wish to have content shared to. Any number of social media platforms is contemplated. In some embodiments, for example, the system will request a single social media platform, two social media platforms, three social media platforms, etc. In some embodiments, when selecting a particular social media platform, the user will be prompted to provide their username and password for that platform so the system can access their account for the purpose of posting content. In step 435, the system will request the user to select an application subscription level they would like to register for. In some embodiments, the system offers a plurality of subscription levels, including, for example, a free level and various paid levels. In such embodiments, the number of benefits provided by the system depends on the level of subscription selected. In some embodiments, steps 415-435 and steps 416-435 can be carried out in any order, in a sequential order, in a specific order, or simultaneously.

In some embodiments, the content module 204 is configured to facilitate the reception or import of content, such as an article discussing a specific topic, into the application platform 200. In some embodiments, the content is configured to engage, inform, support, or delight a particular target audience. Those of ordinary skill in the search engine optimization art would appreciate the importance of focusing on substantive content and its function as a foundation for the other SEO efforts. The content can be any particular file type. In some embodiments, the content module 204 converts a file to a preferred file type.

Figure 5:
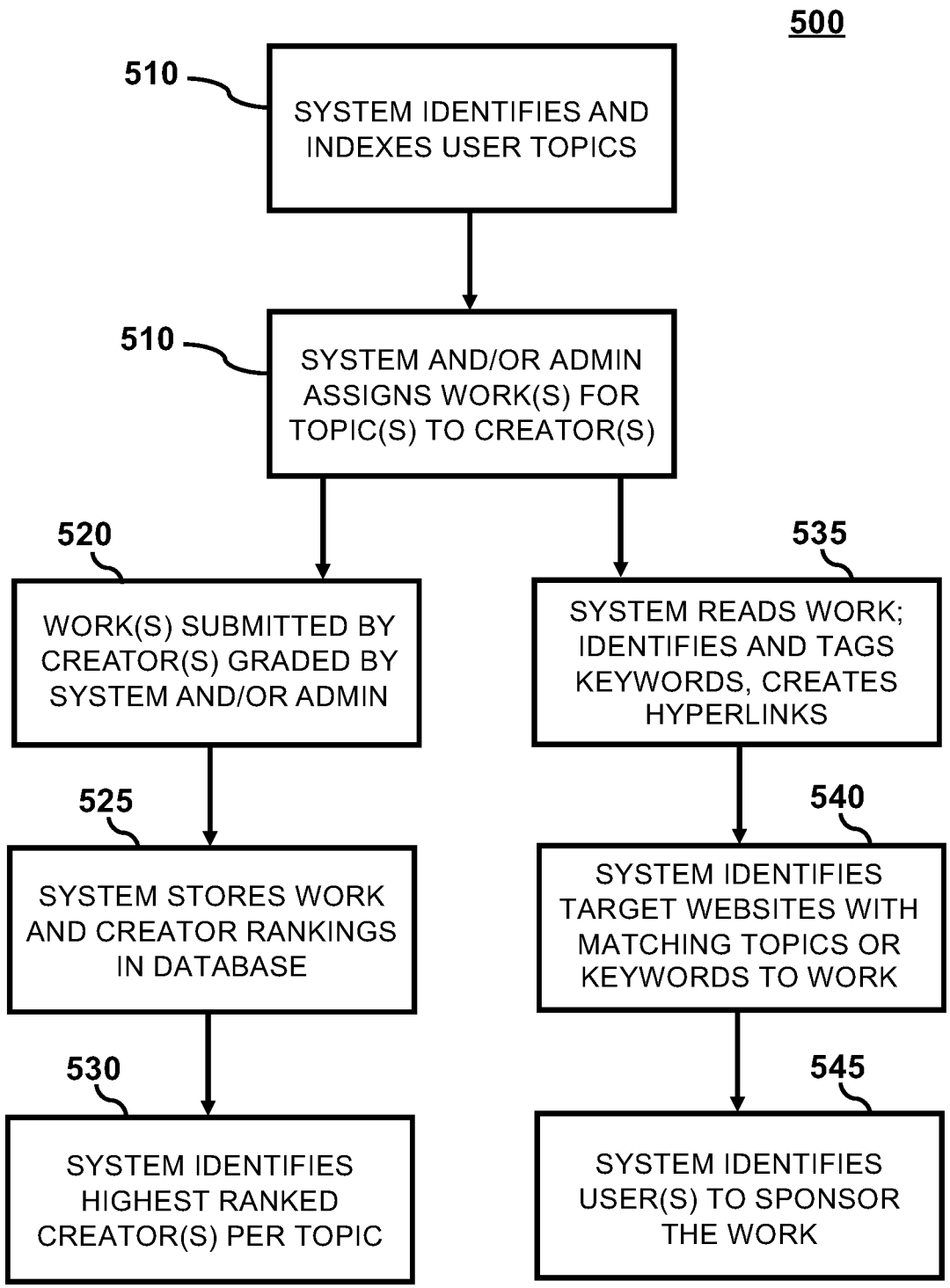
FIG. 5 is a flowchart of a process in accordance with some embodiments described herein.

As shown in FIG. 5, step 510 of the process 500 for preparing content for publication, the system is configured to identify and index topics. In some embodiments, the topics are indexed with specific users, authors, and/or creators. In step 515, the system or an administrator assigns the "work" (e.g., an article, video, infographic, meme, etc.) to be created/drafted on one or more specific topics to one or more specific authors/creators. Once the work has been drafted/created, the author/creator submits the same to the system for review and scoring. In some embodiments, the work is submitted by an author/creator to the application platform 200 or a platform administrator.

In step 520 and/or step 535, once the work is received, the administrator ("admin") evaluates the work and provides a score for the content as submitted. In some embodiments, the "work score" is determined based on one or more factors, including a correctness (e.g., grammar) score, an originality (e.g., no plagiarism) score, the article length and the sources cited if the work is an article, the meta descriptions, the type of work (e.g., news, research), etc. In some embodiments, the one or more factors, e.g., the grammar score and/or originality score, are determined by an automated system configured to analyze those aspects of a work. In some embodiments, two or more factors are weighed according to importance, either evenly or unevenly, to obtain the overall work score. In some embodiments, there is an author/creator score determined by the evaluation scores received by the specific author/creator. The author/creator score can then be used to determine the best author/creator for a specific topic. In step 525, the database engine 220 saves the work, work grade, and author/creator grade into one or more databases. In step 530, the system identifies the highest ranked author/creator for one or more particular topics or one or more particular target websites.

When content has been received in the application platform 200, the reading module 206 is configured to analyze the content. In step 535, the reading module 206 is configured to analyze content in a manner utilized by search engines, including the processing of textual content, key content tags and attributes, title tags, etc., and identify the topics featured in the content. In some embodiments, the content is an article, which is uploaded into the application platform 200, and read by the reading module 206. In such embodiments, the reading module 206 is configured to identify one or more predetermined topics in the article (e.g., topics that are also associated with one or more target websites).

In some embodiments, in step 535, when the uploaded content is an article, the automatic on-page link (AOPL) module 210 is configured to identify keywords and longtail keyword sequences (i.e., at least two keywords in succession or in close proximity) (collectively "keywords") in the article. In some embodiments, the keywords have been predetermined. For example, in some embodiments, the keywords are specific to a specific target website the application platform 200 is in communication with. In that scenario, the AOPL is configured to look for those keywords. In some embodiments, the keywords are included in the body of an article, the title, a subheading, or the URL. In some embodiments, a keyword is associated with a specific target website. In such embodiments, for example, the article and keyword are linked to a URL and a hyperlink is imbedded in the article to that URL. Those of ordinary skill in the search engine optimization art would appreciate that automatic on-page links can cause each of the linking and the linked article to rank higher. In some embodiments, a predetermined number of page links will be provided for each article. For example, the system can include a default whereby one page link is provided per article. Alternatively, the default can be defined as two or more page links. In some embodiments, the default for the page links is determined by the subscription level of the user or by the article type and length.

In some embodiments, the randomization module 212 is configured to manage certain aspects of the AOPL module 210 and/or content module 204. In such embodiments, the randomization module 212 is configured to maintain a ledger of topics and keywords in the randomizing database 350. The randomizing database 350 is configured to store data associated with which topics are used and/or featured in an article, when the last time those topics were used and/or featured in an article, and how often those topics have ever been used and/or featured in an article. Similarly, the randomizing database 350 is configured to store data associated with which keywords have been used and/or marked with on-page links, when the last time those keywords were used and/or linked in an article, and how often those keywords have ever been used and/or linked in an article. In some embodiments, randomization module 212 is configured to create a table listing the data stored for topics and keywords, and provide a user interface for a system administrator to consider the data. In some embodiments, when a topic and/or keyword is selected using the keyword listed nearest to the top of the table and used in an article at the time the article is presented to the AOPL module 210, then those particular topics and/or keywords are moved to the bottom of the table so that they will not be selected prior to other topics and/or keywords in the table. In some embodiments, the system of publishing articles on target websites and sharing on social media platforms depends on the table of topics and/or keywords, the data can be sorted to avoid successive articles directed to the same topic and/or keywords. In this context, the randomization module 212 is configured to provide a random selection of topics and/or keywords.

In some embodiments, the target website module 214 is configured to facilitate the connection and/or communication, including the transmittal of data, between the application platform 200, including retrieval from or submission to the target website database 320, and one or more target websites. The target websites can be directed to any particular topic or area (e.g., news, law, insurance, finance, etc.). In some embodiments, the target website module 214 is configured to recognize specific keywords that should be associated with content on that website. In some embodiments, the content on a target website is focused on a niche market and can therefore be used for lead generation. Further, publishing a work (e.g., article) on a target website will enhance the sponsor/author/creator's visibility and credibility in the niche market. In step 540, the system identifies the particular target website(s) that match the topic and/or keywords included in or with the work.

In some embodiments, as shown in step 545, the matching module 216 is configured to match specific works to one or more particular users. In some embodiments, the matching function is based on the topics and target websites selected by a user in steps 410-420 of FIG. 4 with the topics and keywords associated with one or more target websites. In some embodiments, the rankings associated with the user-selected topics or target websites is used in the matching function. Once a matching score is obtained, it can be utilized to determine which user the work is most closely aligned with. For example, if several users have identified the topic and/or target website that closely aligns with the topic(s) in the article, then the matching scores can be used to determine which of the several users ranked the topic and/or target website the highest, and the work will go to the best matched user/sponsor, as provided in step 545 in FIG. 5.

In some embodiments, prior to transmittal of an article to a target website, the enhancement module 208 is configured to enhance the author or sponsor's name. In this context, a sponsor is a user that is matched with an article and the article is published with the sponsor's name, either attributing the sponsor as the author or as a sponsor. In such embodiments, the author or sponsor's name is enhanced using any one or more on-page optimization tools commonly used to enhance the content provided in an article, video, or other contribution (e.g., tags, hyperlinks). The enhancement module 208 is distinct from existing systems, which are optimized for the content of the article. For example, for an article titled "How to Maximize Your Social Security Benefits," by John Doe, existing methods of search engine optimization would optimize the phrase "Maximize Your Social Security," whereas the enhancement module 208 optimizes both "Maximize Your Social Security" and "John Doe."

In some embodiments, the sharing module 218 is configured to share content that has been submitted for publication on a target website to one or more social media platforms. In some embodiments, the content is a work (e.g., an article) published on a specific target website for a specific user, and the sharing module 218 will automatically share (e.g., post) the article to the social media platform(s) identified by the user in step 430 of FIG. 4. In some embodiments, the content, or article in the above example, will be further shared on one or more additional user's social media account(s). The one or more additional users can have any subscription level.

In such embodiments, the sharing module 218 provides a benefit to the target website and the social media platform because a work (e.g., an article) published on the site that is also shared to social media platform brings new content to those websites, which expands the chances those websites are discovered when someone uses a search engine to locate information on the subject matter featured and/or discussed in the work or enhanced through the enhancement module 208. Thus, publishing and sharing provide exposure and visibility to the target website, the topic and enhanced attributes within the work, and possibly the social media platform. A benefit is provided for the user because publishing a work on a target website and sharing the same on one or more social media platforms may provide an association of the subject matter featured and/or discussed in the work with the user's name (because the work is enhanced for the user/sponsor's name). As such, the visibility of the user as an author or sponsor of specific subject matter is increased, and each time the work is shared it gains more credibility in the context of search engine optimization. These benefits are outlined in the process 800 in FIG. 8. In step 810, in which the system tracks and records data associated with the sharing of a work on social media from a target website; and step 820, in which the system increases the user's ranking on the target website after the work is shared.

In some embodiments, the display module 228 is configured to display one or more graphic user interfaces. In some embodiments, the display module 228 is configured to temporarily generate and display various pieces of information in response to one or more commands or operations. The various pieces of information or data generated and displayed may be transiently generated and displayed, and the displayed content in the display module 228 may be refreshed and replaced with different content upon the receipt of different commands or operations in some embodiments. In such embodiments, the various pieces of information generated and displayed in a display module 228 may not be persistently stored.

In some embodiments, the communication module 230 is configured for receiving, processing, and transmitting a user command and/or one or more data streams. In such embodiments, the communication module 230 performs communication functions between the user computing device 222, the administrator computing device 224, and a third-party computing device 226. In some embodiments, the communication module 230 is configured to allow one or more users of the system to communicate with one another. In some embodiments, the communications module 230 is configured to maintain one or more communication sessions with one or more servers, the administrator computing device 224, and/or one or more third party computing device(s) 226.

A benefit is provided to the additional user who receives the shared work on their social media account because they are provided with a work that may be of interest to one of their contacts on a social media platform. Accordingly, there is a symbiotic relationship between the first user who sponsors the work for publication on the target website and the additional user who gets content shared on their social media platform. In this scenario, a symbiotic relationship is created for disparate users who may otherwise never benefit from the existence of the other. Further, there is no effort or user-specific activity required for either user.

Figure 6:
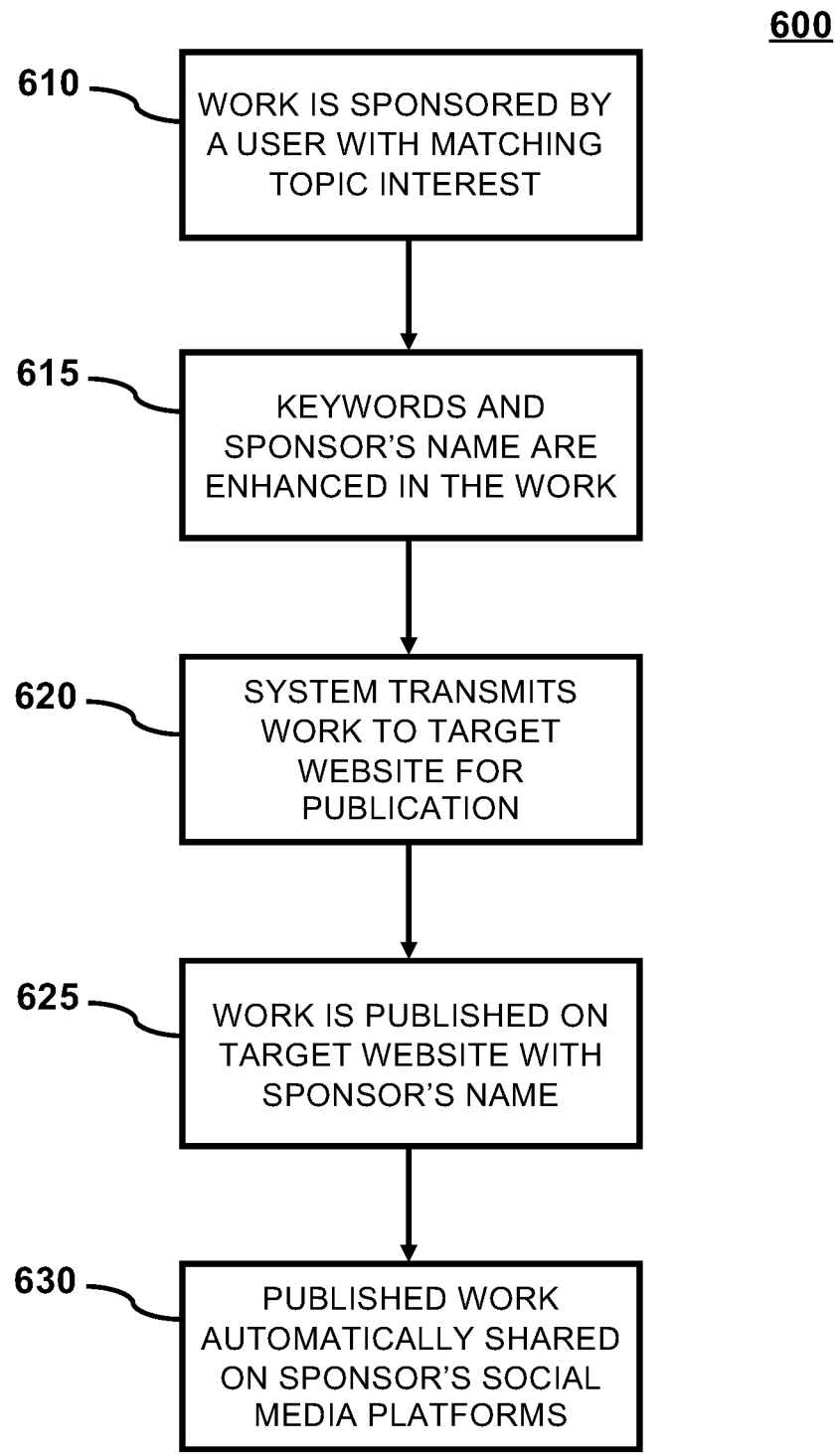
FIG. 6 is a flowchart of a process in accordance with some embodiments described herein.

FIG. 6 shows the process 600 for publishing and sharing a work (e.g., an article). In step 610, after the best-matched users are identified, the system selects a specific user for sponsorship. In some embodiments, the selected user is allowed to refuse to sponsor the work. For example, in some embodiments, the system includes a default whereby a selected user has opted-in for whichever work is assigned to them by the system, but the selected user is allowed to actively engage with the system to opt-out for particular work. In such a scenario, the system will select a "next best" user based on the matching score. The work is then enhanced for the sponsor's name in step 615, before transmitting the work to a target website for publication in step 620. Next, the work is published on the target website in step 625 and shared on the user's predetermined social media platforms in step 630.

Figure 7:
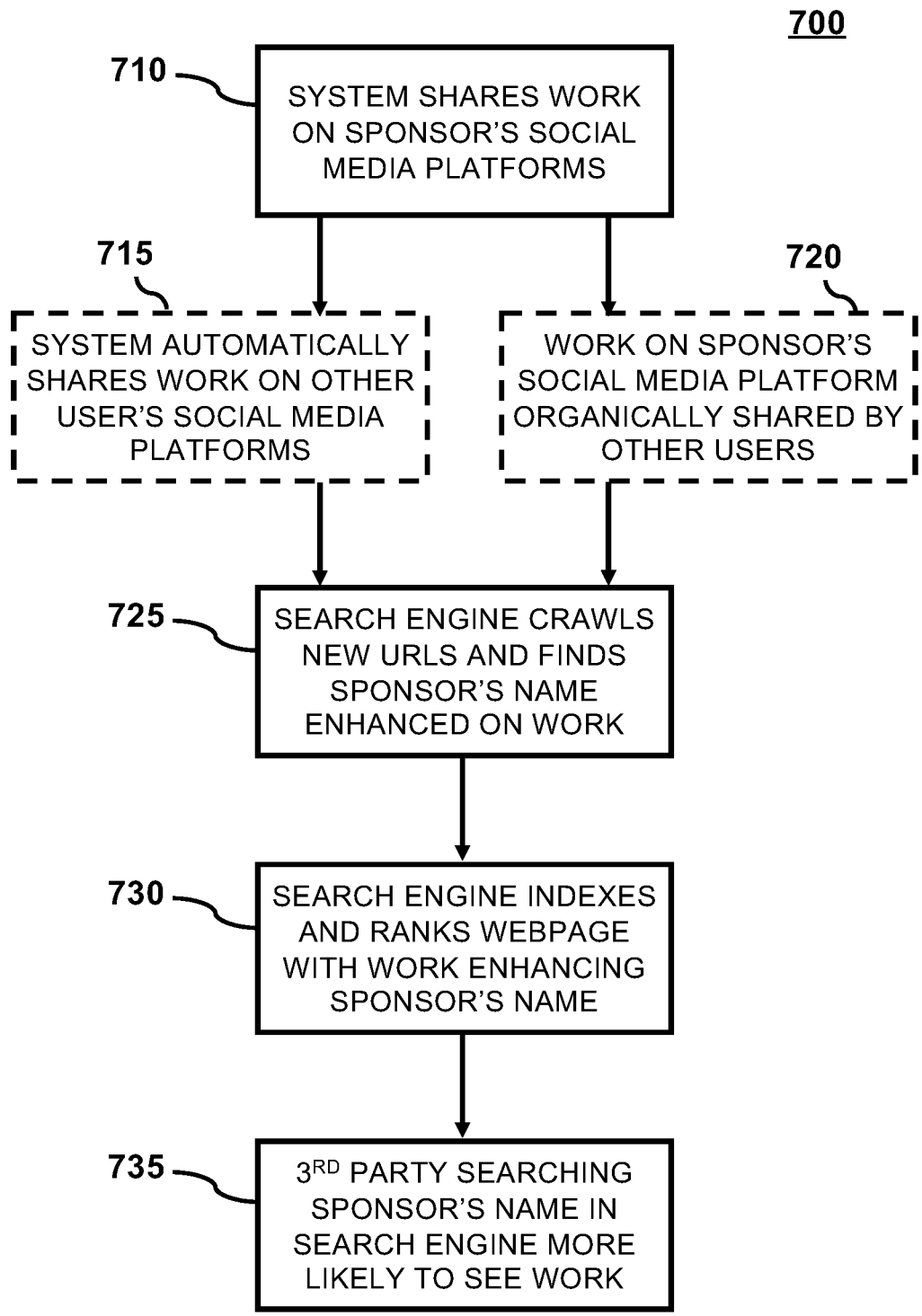
FIG. 7 is a flowchart of a process in accordance with some embodiments described herein.
Figure 8:
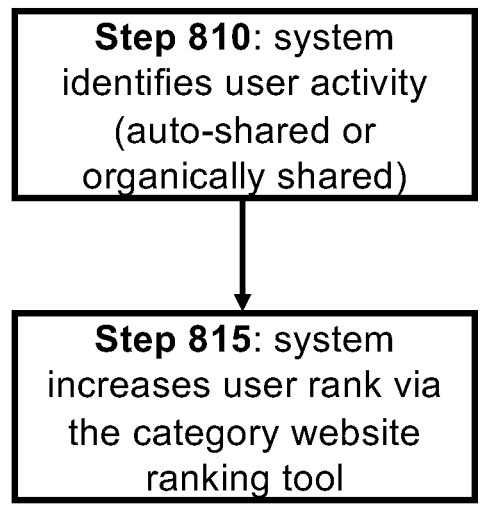
FIG. 8 is a flowchart of a process in accordance with some embodiments described herein.

FIG. 7 shows the process 700 for amplifying a user's online visibility and credibility so that an interested searcher can find the content and the user. In step 710, the article is shared on the user's predetermined social media platforms. Optionally, in step 715, the article is also shared on an additional user's predetermined social media platforms. Alternatively, in optional step 720, the article is shared organically by other users on the social media platforms. Each time the article is shared it increases the visibility of the author and the perceived knowledge of the author for the topic in the article. Once an article has been published on a target website and shared on the user's social media platform, the keywords that were previously activated as links by the AOPL module 210 can be discovered by a search engine bot when it crawls the Internet for new webpages, as shown in step 725. After the article is indexed and ranked in the search engine databases, the article is discoverable by others using the search engine to search keywords related to the topic and/or keywords. In step 730, the sponsor's name is also indexed and ranked by the search engine because the enhancement module 208 optimized their name in step 615 of the process 600. In step 735, when a third-party searcher 226 conducts a search on a search engine, the article and author (sponsor) name are more likely to be discovered because it has been indexed and ranked by the search engine. In a scenario where the searcher is looking for a professional, being discovered by the searcher is critical to landing the searcher as a lead.

During use, the application platform 200 provides several advantages over existing processes for search engine optimization. In one aspect, the application platform 200 amplifies the online presence and credibility of a user automatically, i.e., without time consuming and labor-intensive manual efforts. The processes performed by the application platform 200 aggregate the efforts of all users to enhance each user's individual online presence and credibility. One of ordinary skill in the art would appreciate that a written work on a topic appearing on the front page of search engine (e.g., Google, Bing) result suggests to a searcher that the author (sponsor) is knowledgeable on the topic. In terms of lead generation, the search result suggests that the author is more worthy of consideration when a searcher is looking for a knowledgeable professional (e.g., financial advisor, attorney, doctor, etc.).

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the flowchart and block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A computer implemented method for amplifying an online visibility and credibility of a matching user of an application platform, comprising:
   providing the application platform for carrying out the method;
   assigning a desired work related to a defined topic to a creator;
   receiving a drafted work from the creator in an electronic file type;
   grading the drafted work based on one or more predetermined attributes;
   reading the drafted work with an automated reader configured to read the electronic file type to identify and tag one or more keywords corresponding to the defined topic;
   identifying one or more target websites, having attributes associated with the defined topic and/or the one or more keywords;
   identifying one or more accepted users for sponsoring the drafted work on a selected target website of the one or more target websites, wherein at least one accepted user is identified by:
   receiving an indication that a non-user wants to join the application platform;
   presenting a user interface including a request for the non-user to input and submit their user information;
   presenting a user interface including a request for the non-user to select one or more topics of interest offered by the application platform;
   presenting a user interface including a request for the non-user to assign a ranking for the one or more topics of interest in their importance to the non-user;
   presenting a user interface including a request for the non-user to select one or more target websites of interest offered by the application platform;
   presenting a user interface including a request for the non-user to select one or more social media platforms for sharing content offered by the application platform;

presenting a user interface including a request for the non-user to select a subscription level for their user information;
accepting the non-user as an accepted user of the application platform;
indexing and storing the user information submitted by the accepted user in a user database;
indexing and storing the one or more topics selected by the accepted user in the user database and a topic database;
indexing and storing the one or more target websites selected by the accepted user in the user database and a target website database;
indexing and storing the one or more social media platforms selected by the accepted user in the user database and a social media database; and
indexing and storing the subscription level selected by the accepted user in the user database;
performing the following to select a matching user from the identified one or more accepted users to sponsor the drafted work;
identifying the one or more topics and the one or more target websites selected by one or more accepted users;
identifying a ranking of the topics assigned to the one or more topics selected by the one or more accepted users;
determining which of the one or more accepted users ranked the defined topic in the drafted work higher than other topics of the one or more topics selected by the one or more accepted users; and
defining the one or more accepted users determined to rank the defined topic higher than other topics as the matching user;
enhancing the drafted work for the keywords and the matching user to obtain the desired work;
transmitting the desired work to the selected target website;
publishing the desired work on the selected target website; and
sharing the desired work on one or more social media platforms selected by the matching user.

2. The computer implemented method of claim 1, further comprising: sharing the published work on one or more social media platforms selected by a second user.

3. The computer implemented method of claim 1, wherein the keywords and matching user are enhanced in the drafted work using one or more enhancement tools selected from hyperlinking, backlinking, and tagging.

4. The computer implemented method of claim 1, wherein the automated reader is configured to analyze content in a manner utilized by search engines, including processing of textual content in the drafted work, identifying content tags and attributes in the drafted work, identifying title tags in the drafted work, and identifying the defined topic featured in the drafted work.

5. The computer implemented method of claim 1, wherein the one or more predetermined attributes are selected from a correctness score, an originality score, a length of the drafted work, sources cited in the drafted work, meta descriptions, a type of the drafted work.

6. The computer implemented method of claim 1, wherein the creator assigned to draft the work is selected based on a creator ranking saved in a creator database.

7. The computer implemented method of claim 1, wherein the sharing the desired work occurs automatically through a function of the application platform.

8. A computer program product comprising a non-transitory computer readable storage medium having program instructions embodied therewith, the program instructions executable by a computer processor to cause the computer processor to perform a method, comprising:
providing an application platform for carrying out the method;
assigning a desired work related to a defined topic for drafting to a creator;
receiving the drafted work from the creator in an electronic file type;
grading the drafted work based on one or more predetermined attributes;
reading the drafted work with an automated reader configured to read the electronic file type to identify and tag one or more keywords corresponding to the defined topic;
identifying one or more target websites having attributes associated with the defined topic and/or the one or more keywords;
identifying one or more accepted users for sponsoring the drafted work on a selected target website of the one or more target websites, wherein at least one accepted user is identified by:
receiving an indication that a non-user wants to join the application platform;
presenting a user interface including a request for the non-user to input and submit their user information;
presenting a user interface including a request for the non-user to select one or more topics of interest offered by the application platform;
presenting a user interface including a request for the non-user to assign a ranking for the one or more topics of interest in their importance to the non-user;
presenting a user interface including a request for the non-user to select one or more target websites of interest offered by the application platform;
presenting a user interface including a request for the non-user to select one or more social media platforms for sharing content offered by the application platform;
presenting a user interface including a request for the non-user to select a subscription level for their user information;
accepting the non-user as an accepted user of the application platform;
indexing and storing the user information submitted by the accepted user in a user database;
indexing and storing the one or more topics selected by the accepted user in the user database and a topic database;
indexing and storing the one or more target websites selected by the accepted user in the user database and a target website database;
indexing and storing the one or more social media platforms selected by the accepted user in the user database and a social media database; and
indexing and storing the subscription level selected by the accepted user in the user database;
performing the following to select a matching user from the identified one or more accepted users to sponsor the drafted work;
identifying the one or more topics and the one or more target websites selected by one or more accepted users;

identifying a ranking of the topics assigned to the one or more topics selected by the one or more accepted users;

determining which of the one or more accepted users ranked the defined topic in the drafted work higher than other topics of the one or more topics selected by the one or more accepted users; and defining the one or more accepted users determined to rank the defined topic higher than other topics as the matching user;

enhancing the drafted work for the keywords and the matching user to obtain the desired work;

transmitting the desired work to the selected target website;

publishing the desired work on the selected target website; and sharing the desired work on one or more social media platforms selected by the matching user.

9. The computer program product of claim 8, wherein the method further comprising:

sharing the desired work on one or more social media platforms selected by a second user.

10. The computer program product of claim 8, wherein the keywords and matching user are enhanced in the drafted work using one or more enhancement tools selected from hyperlinking, backlinking, and tagging.

11. The computer program product of claim 8, wherein the automated reader is configured to analyze content in a manner utilized by search engines, including processing of textual content in the drafted work, identifying content tags and attributes in the drafted work, identifying title tags in the drafted work, and identifying the defined topic featured in the drafted work.

12. The computer program product of claim 8, wherein the one or more predetermined attributes are selected from a correctness score, an originality score, a length of the drafted work, sources cited in the drafted work, meta descriptions, a type of the drafted work.

13. The computer program product of claim 8, wherein the sharing the desired work occurs automatically through a function of the application platform.

* * * * *